March 21, 1933.  C. BAIRD ET AL  1,902,749
ATTACHING MEANS FOR FISHING REELS
Filed April 19, 1932
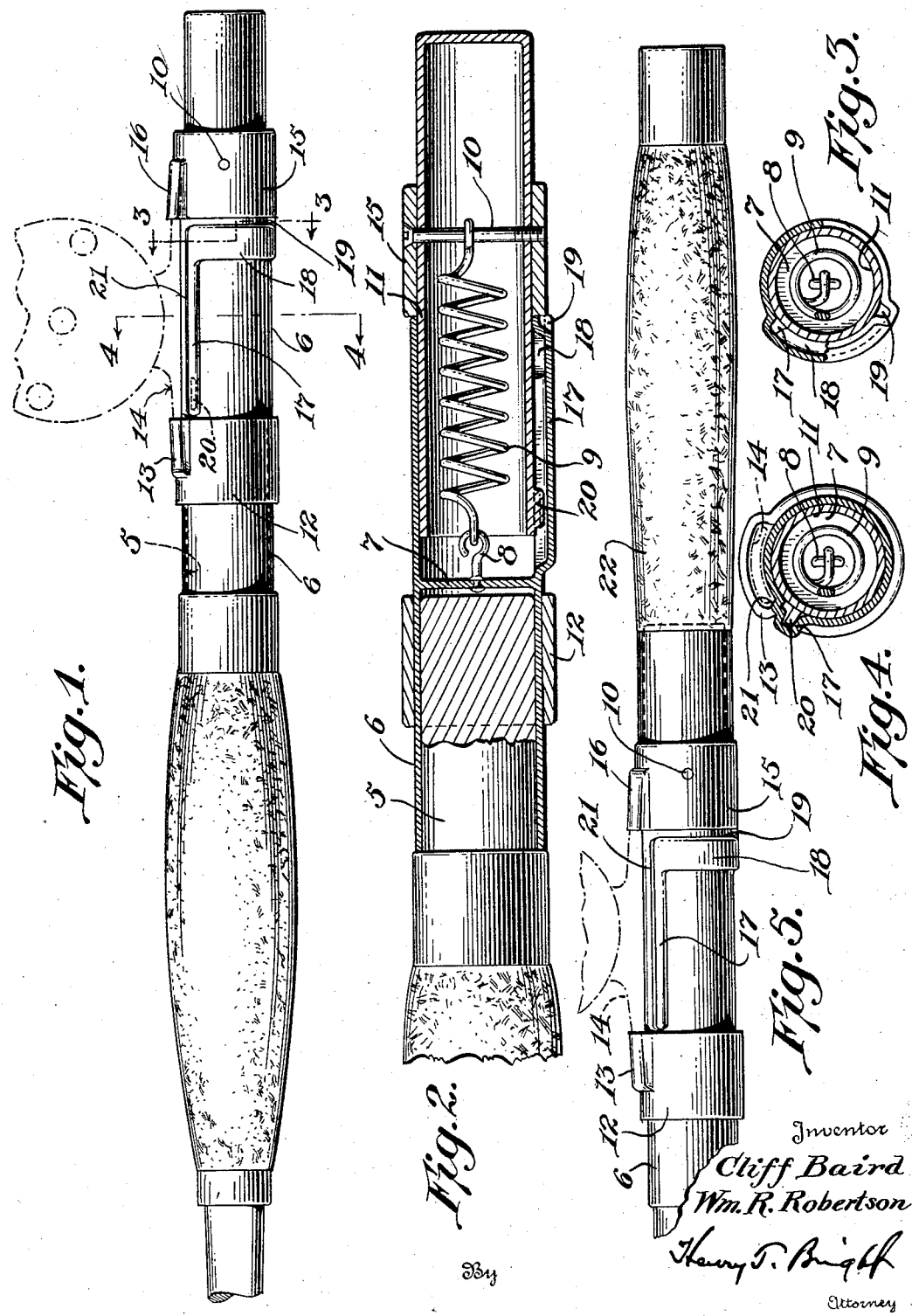
Inventor
Cliff Baird
Wm. R. Robertson
Henry T. Bright
By
Attorney Patented Mar. 21, 1933

1,902,749

UNITED STATES PATENT OFFICE

CLIFF BAIRD AND WILLIAM R. ROBERTSON, OF EUGENE, OREGON

ATTACHING MEANS FOR FISHING REELS

Application filed April 19, 1932. Serial No. 606,210.

Our invention relates to fishing rods and has particular reference to attaching means for the fishing line reels.

The primary object of the invention is to provide a reel-seat upon which the reel may be easily and quickly mounted in position or removed therefrom and embodying a novel construction for retaining one of the pockets for the reel-base out of reel engaging position while the reel is being mounted on the base and guiding the pockets into position for engaging and securing the reel after the latter is placed on the reel-seat.

Another object is to provide a spring retracted, telescoping carrier for one of the pockets of the reel base and having guide means for maintaining said pocket in alignment with a stationary pocket and enclosing said guide means to protect the same and prevent accidental releasing movement of the pocket when the reel is in use.

A further object is to provide a reel attaching member capable of removably mounting on the end of either a fly-casting or bait-casting fishing rod of conventional construction without necessitating any changes or alterations on the construction of the rod.

Other objects and advantages will become apparent after a consideration of the following detailed description when reviewed together with the accompanying drawing forming part hereof, wherein like numerals refer to like parts throughout, and in which Figure 1 is an elevational view showing the device in position on the fishing rod;

Figure 2, a longitudinal sectional view;

Figure 3, a transverse sectional view taken on the line 3—3 of Figure 1;

Figure 4, a section on the line 4—4 of Figure 1; and

Figure 5, a modified form showing the holder in use upon a bait-casting rod.

Referring now to the drawing in detail, wherein for the purpose of illustration we have disclosed a preferred embodiment of our invention, the numeral 5 designates the butt end of a fishing rod over which is fitted one end of a sleeve 6, the free end of the sleeve terminating beyond the rod.

A transverse partition 7 is secured in the sleeve from which a hook 8 projects and to which one end of an expansible coil spring 9 is attached. The opposite end of the spring is secured to a pin or bolt 10 extending transversely in a tubular carrier 11 which is telescopically mounted in the free end of the sleeve. The pin or bolt 10 is preferably threaded in the walls of the carrier for convenience in assembling the parts and the spring 9 yieldably urges the carrier inwardly of the sleeve in telescoping position.

A metallic band 12 is fixedly secured to the sleeve having a portion pressed outwardly to form a pocket 13 for receiving one end of the reel base 14 of usual construction. A similar band and pocket 15 and 16, respectively, is fixedly secured to the carrier for receiving the other end of the reel base, the edge of the band forming an abutment for the end of the sleeve to limit the inward movement of the carrier.

The inner wall of the sleeve is formed with a longitudinal groove 17 in alignment with one of the side edges of the pocket 13, the outer end of said groove communicating with one end of an annular groove 18 partly encircling the inner wall of the sleeve adjacent the free end thereof. The opposite end of the annular groove communicates with a relatively short longitudinal groove 19 extending to the free edge of the sleeve.

A projection 20 is formed on the outer surface of the carrier adjacent its inner edge for sliding in the grooves 17, 18 and 19 of the sleeve, the projection being in longitudinal alignment with one edge of the pocket 16 and from which it will be apparent that by inserting the projection in the groove 19 and sliding the same along the annular groove 18 until the longitudinal groove 17 is reached, the pockets will be aligned, whereupon the releasing of the carrier will permit the spring to draw the pocket 16 inwardly for securing the reel base in position.

A longitudinal rib 21 is formed on the outer surface of the sleeve which serves as an abutment for one of the longitudinal edges of the reel base, thus enabling the centering of the base in proper position for engagement by the pocket of the carrier. This rib 21 and groove 17 are preferably formed at a single operation by punching the material of the sleeve outwardly.

When mounting the reel in position on the rod, or when removing the same therefrom, the outer end of the carrier is pulled outwardly until the projection reaches the outer end of the longitudinal groove 17. Then by turning the carrier in a direction to slide the projection in the annular groove 18, the carrier will be held in its outwardly extended position. As soon as the carrier is turned in a position to align the pockets, the spring will return the carrier inwardly.

By forming the grooves for the projection on the inner walls of the sleeve, the parts for guiding the carrier into and out of the sleeve are completely enclosed and protected, so that all danger of releasing the reel by accidental contact of the projection with the clothing or other objects is avoided.

When it is desired to use the attachment on bait-casting rods, the outer end of the carrier may be provided with an extension 22 to form a handle. This handle may be detachably secured to the carrier or formed integrally therewith, if preferred, to simplify its manufacture.

We claim:

1. A reel holder for fishing rods comprising a sleeve attachable to the rod, a spring retracted carrier telescopically mounted therein, pockets on the sleeve and the carrier for receiving the reel base, said sleeve having a longitudinal groove on its inner wall, and a projection on the carrier slidable in said groove and maintaining the pockets in alignment.

2. A reel holder for fishing rods comprising a sleeve attachable to the rod, a spring retracted carrier telescopically mounted therein, pockets on the sleeve and the carrier for receiving the reel base, said sleeve having a longitudinal groove on its inner wall and an annular groove communicating with the outer end of said longitudinal groove, and a projection on the carrier slidable in said grooves, said annular groove cooperating with the projection to retain the carrier outwardly of the sleeve and said longitudinal groove constituting a guide for the projection for aligning the pockets during inward movement of the carrier.

3. A reel holder for fishing rods comprising a sleeve attachable to the rod, a spring retracted carrier telescopically mounted therein pockets on the sleeve and the carrier for receiving the reel base, said sleeve having an annular groove on its inner wall adjacent its outer end, and a pair of oppositely extending longitudinal grooves terminating at the outer edge of the sleeve, and a projection on the carrier slidable in said grooves, said annular groove cooperating with the projection to retain the carrier outwardly of the sleeve and the other of said longitudinal grooves constituting a guide for the projection for aligning the pockets during inward movement of the carrier.

4. A reel holder for fishing rods comprising a sleeve attachable to the rod, a spring retracted carrier telescopically mounted therein, pockets on the sleeve and the carrier for receiving the reel base, said sleeve having a longitudinal groove on its inner wall defining a rib on the outer surface of the sleeve constituting an abutment for one side of the reel base whereby to align the base with the pockets, and a projection on the carrier slidable in the groove for maintaining the pockets in alignment.

5. A reel holder for fishing rods comprising a sleeve attachable to the rod, a spring retracted carrier telescopically mounted therein, pockets on the sleeve and the carrier for receiving the reel base, said sleeve having a longitudinal groove on its inner wall defining a rib on the outer surface of the sleeve constituting an abutment for one side of the reel base whereby to aline the base with the pockets, and a projection on the carrier slidable in the groove for maintaining the pockets in alinement, said sleeve also having an annular groove on its inner wall communicating with the outer end of said longitudinal groove for receiving the projection to retain the carrier in an outwardly projected position.

In testimony whereof we hereunto affix our signatures.

CLIFF BAIRD.
WILLIAM R. ROBERTSON.